March 5, 1957  J. J. BRAMBLETT  2,783,918
METERING PLANTER DEVICES
Filed April 30, 1954  6 Sheets-Sheet 1
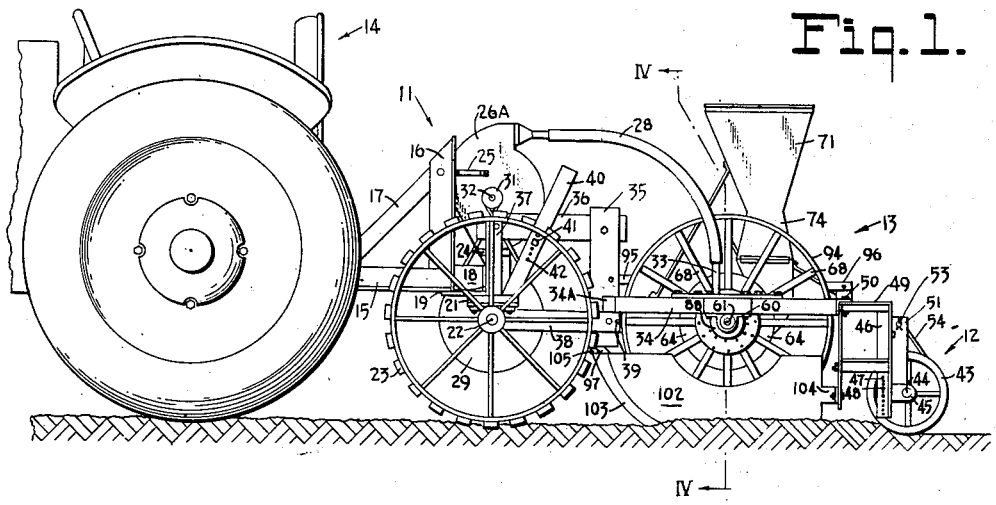
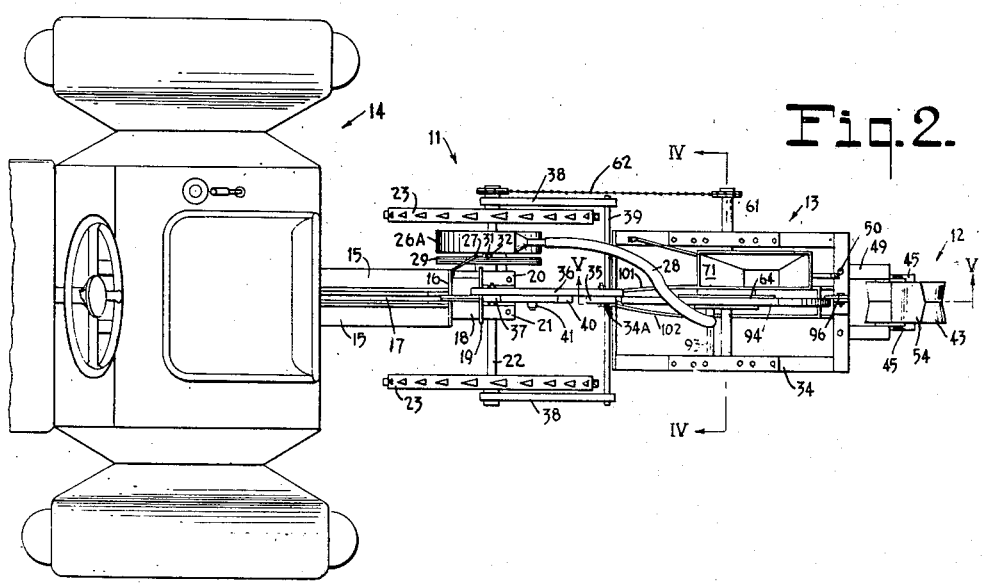
JOHN J. BRAMBLETT,
INVENTOR
BY
Weatherford & Weatherford
attys March 5, 1957 J. J. BRAMBLETT 2,783,918
METERING PLANTER DEVICES
Filed April 30, 1954 6 Sheets-Sheet 2

JOHN J. BRAMBLETT,
INVENTOR

BY
Weatherford & Weatherford
attys

March 5, 1957
J. J. BRAMBLETT
2,783,918
METERING PLANTER DEVICES
Filed April 30, 1954
6 Sheets-Sheet 3
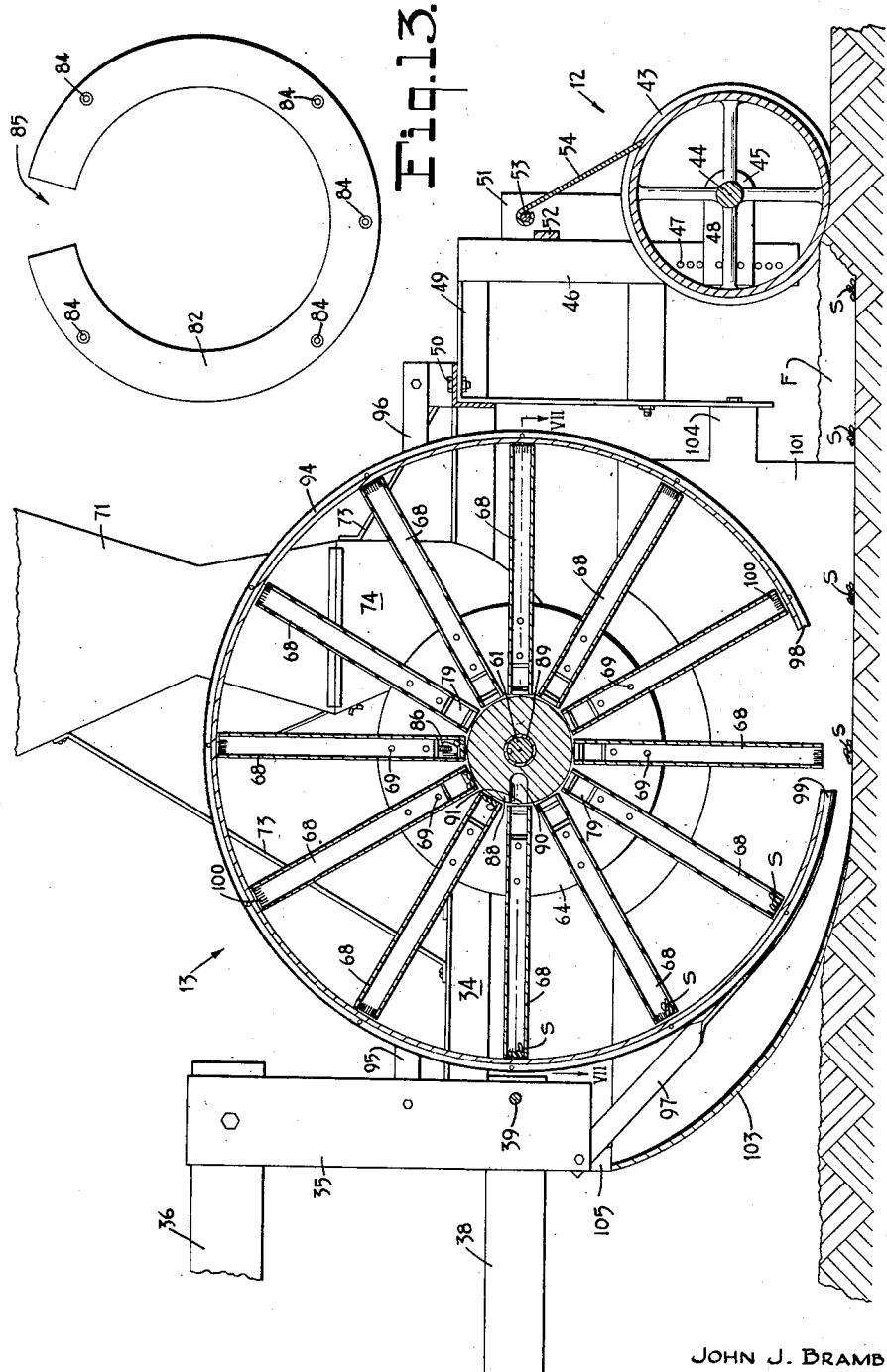
JOHN J. BRAMBLETT,
INVENTOR
BY
Weatherford & Weatherford
atty.

March 5, 1957  J. J. BRAMBLETT  2,783,918
METERING PLANTER DEVICES
Filed April 30, 1954  6 Sheets-Sheet 4

JOHN J. BRAMBLETT,
INVENTOR

BY
Weatherford & Weatherford
attys

March 5, 1957 J. J. BRAMBLETT 2,783,918
METERING PLANTER DEVICES
Filed April 30, 1954 6 Sheets-Sheet 5
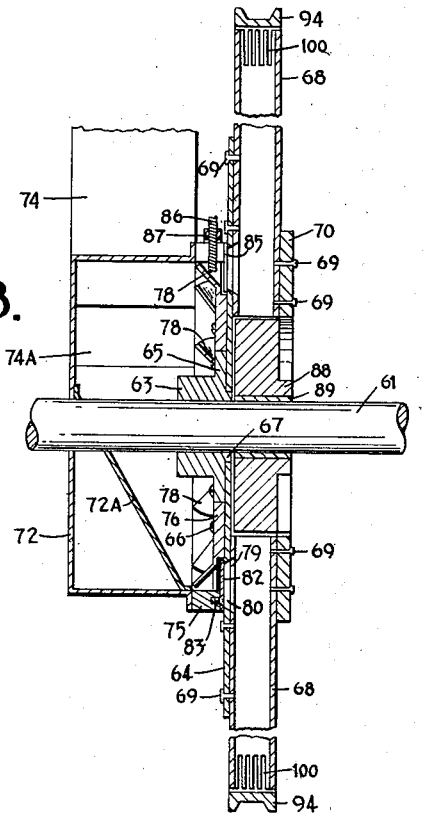
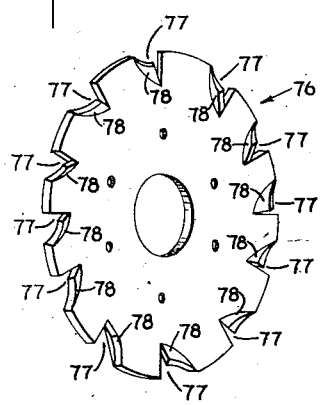
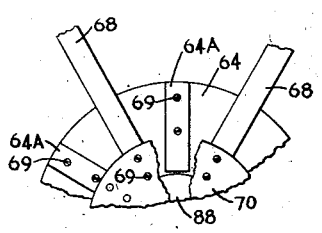
JOHN J. BRAMBLETT,
INVENTOR

JOHN J. BRAMBLETT,
INVENTOR

United States Patent Office 2,783,918
Patented Mar. 5, 1957

2,783,918

METERING PLANTER DEVICES

John J. Bramblett, Pine Bluff, Ark., assignor, by mesne assignments, to Ben Pearson Incorporated, Pine Bluff, Ark., a corporation of Arkansas Application April 30, 1954, Serial No. 426,831

19 Claims. (Cl. 222—177)

This invention relates to certain new and useful improvements in planter devices, and is particularly adapted for depositing accurately measured quantities of seed at regularly and equally spaced intervals as along a crop row.

More specifically, the present invention is particularly adapted for accurately measuring successive charges of seeds, transferring such measured charges to depositing means, ultimately depositing the seeds in a closely grouped pattern by gravity, and the device preferably includes pneumatic means for insuring shift of the seeds from the point of transfer to a remote point for conveniently depositing same in planting.

Devices have heretofore been contemplated for the purpose of mechanically depositing seeds as along a desired crop row, but these prior devices have primarily been defective and inefficient in failing properly to deposit the seeds in an accurately placed group, and have more particularly been defective in that the planting deposit of seeds has been seriously affected by variations in ground surface and/or by changes in speed of travel of the planting device resulting in an undesired and inaccurate scattering of the seeds, causing waste of same and seriously impeding subsequent cultivation after germination and sprouting of the seeds. Additionally, many of the prior devices have necessitated optimum ground moisture conditions for operation and have been substantially inoperative under ground conditions of either excessive dryness or of excessive moisture.

The principal object of the present invention is to provide means for planting crop seeds which substantially insure the accurate deposit or discharge of measured quantities of such seeds in accurately closely grouped patterns at regularly spaced intervals longitudinally of a crop row, and which means is substantially fully operative under varying conditions of ground moisture and contour and at varying speeds of travel along the crop row.

A further object of the invention is to provide a seed planting device by which seeds may accurately be deposited for planting at desired depths.

A further object of the invention is to provide such a device including means for adjusting the depth of planting.

A further object of the invention is to provide a planting device in which seeds may be successively planted at spaced intervals and the spacing may be adjusted as desired while maintaining accurate measurement of the quantity of seeds to be deposited at each selected interval.

A further object of the invention is to provide a planter device comprising a plurality of open ended spoke-like members radially disposed and circumferentially equally spaced apart, the said spoke-like members being mounted for conjoint rotation relative to a non-rotatable shoe or rim for covering the open spoke ends throughout the majority of rotational travel of such spoke-like members, the rim having a gap providing a zone in which such end covering is removed, a bucket wheel member connected to the spoke-like members for rotation concurrently therewith in which said wheel member carries a plurality of scoop-like buckets having open sides, the openings communicating with the interior of the spoke-like members and being segregated from the openings in the spoke like members throughout the major portion of rotational travel of the wheel and spoke-like members, there being a zone of non-segregated travel positioned substantially diametrically opposite the rim gap, the bucket portions of the wheel projecting into a seed supply for successively engaging a measured quantity of seed during such rotation, the seed being delivered into a spoke-like member during the non-segregated portion of travel through said non-segregated zone and being deposited from the spoke-like member by gravity when the said spoke-like member moves across the rim gap and beyond the closing off effect of the shoe or rim.

A further object of the invention is to provide such a planting device which includes a pneumatic blast means positioned to have said spoke-like members successively moved into registering alinement therewith at a point intermediate the non-segregated zone of travel during which seeds are delivered to the spoke-like members and the deposit point when said spoke-like members moved across the rim gap beyond the closing off effect of the rim or shoe, said blast means effecting transfer of the deposited seed, to position same adjacent the radially outer ends of the spoke-like members.

A further object of the invention is to provide a planter device having a plurality of radially extending, rotatably supported hollow spokes, means for delivering measured amounts of seed into said spokes successively adjacent the radially inward end of the spokes as each reaches an elevated position, pneumatic means at an intermediate point for transferring the delivered seed from the inward end to the outward end, means retaining the seed in the spoke adjacent the outward ends as each travels downwardly, the seed being discharged when the spokes successively reach a low point.

A further object of the invention is to provide in such a device a flexible and resilient finger projecting into the path of the buckets carried by said wheel substantially coincident with the non-segregated zone of rotational travel for successive engagement by the buckets during rotational travel to assist in and insure the transfer of bucket-contained seeds into the related spoke-like member.

A further object of the invention is to provide a planter device for accurately measuring and ultimately depositing by gravity seeds at spaced intervals along a crop row; and A further object of the invention is to generally improve the design, construction and efficiency of seed planter devices.

The means by which the foregoing and other objects of the present invention are accomplished and the manner of their accomplishment will be readily understood from the following specification upon reference to the accompanying drawings, in which:

Fig. 1 is a side elevational view of a planter device embodying the present invention.

Fig. 2 is a top plan view of the device of Fig. 1 showing the arrangement of the device for single crop row planting.

Fig. 5 is a longitudinal sectional view on a further enlarged scale taken as on the line V—V of Figs. 2 and 4.

Fig. 8 is a fragmentary sectional view taken as on the line VIII—VIII of Fig. 7.

Fig. 11 is a perspective view of the seed measuring bucket wheel of the invention.

Fig. 13 is a face view of the segregating separator shield employed in the invention.

Fig. 14 is a fragmentary face view of a planter wheel, illustrating blocking of a delivery aperture, parts being broken away for clarity.

Figure 3:
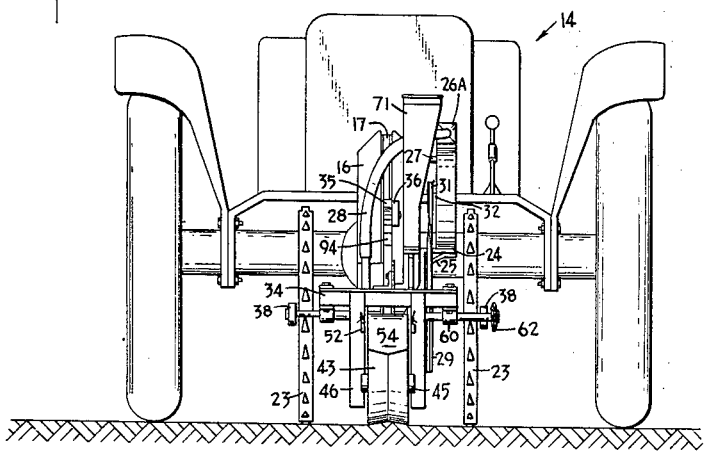
Fig. 3 is a rear end elevational view of the device of Figs. 1 and 2.
Figure 4:
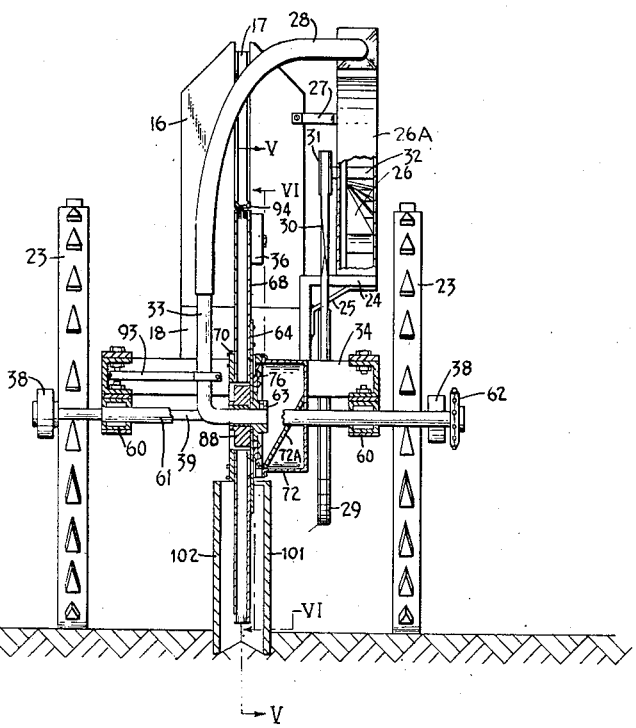
Fig. 4 is a sectional elevational view on an enlarged scale taken as on the line IV—IV of Figs. 1 and 2.
Figure 12:
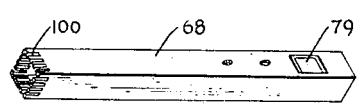
Fig. 12 is a perspective view of one of the tube-like spokes of the device.
Figure 6:
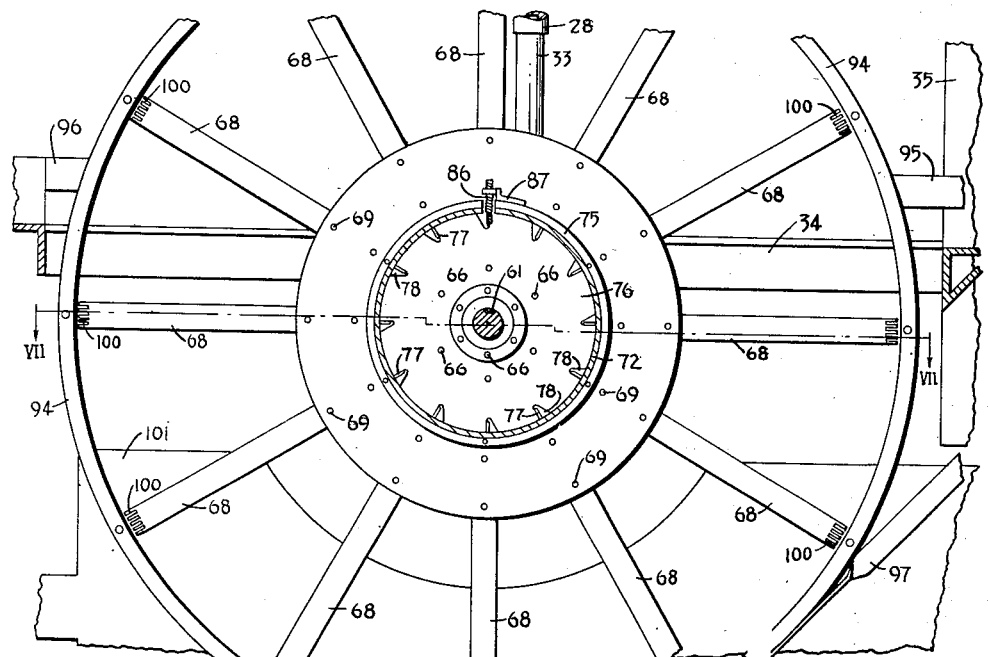
Fig. 6 is a fragmentary sectional elevation, on a further enlarged scale, taken as on the line VI—VI of Figs. 4 and 7.

Referring now to the drawings in which the various parts are indicated by numerals, the present invention comprises a wheeled device including a forward traction portion 11, a rear roller portion 12, and an intermediate planter unit 13, which device is adapted to be connected for draft purposes as to a conventional tractor 14, and is preferably connected to the tractor tool bar. Connection is made through the medium of a substantially triangular draft and elevating means comprising a pair of normally substantially horizontally disposed angle members 15 to which are rigidly fixed as by welding a pair of uprights 16. To the upper end of uprights 15 is pivotally connected a diagonally disposed bar 17. The forward ends of lower members 15 and diagonal bar 17 are connected to the tractor in suitable manner, not shown.

Rigidly fixed to and extending rearwardly from the junction between lower members 15 and uprights 16 are reinforcement gussets 18, each comprising an angle member, the gussets being positioned with one flange of each of the angles extending vertically and in abutment, with the other flange of each of the angles extending horizontally and laterally from the lower end of the vertical flanges so as to create an inverted, substantially T-shaped gusset. The vertical portions are positioned, as best shown in Fig. 2, to lie between the respective lower horizontal members 15 and uprights 16 and the horizontal flanges of the abutting gussets underlie the laterally projecting horizontal flanges of lower members 15 to which they are rigidly fixed as by welding. A plate 19 is transversely disposed across the rear of the abutting gussets 18 and is rigidly fixed to the gussets as by welding. Underlying and welded to the lower portion of plate 19 and the rearward portions of gussets 18 are a pair of longitudinally disposed angle members 20, 21 forming supports for suitable bearings in which is journalled a transverse shaft 22. Drive wheels 23, preferably provided with surface engaging lugs or cleats, are fixed to shaft 22 outwardly of the framework.

A platform 24 is preferably fixed to and supported by one of the bearing supports, as the support 20, the platform preferably being provided with a lower horizontal flange seating on and welded to the upper face of the horizontal flange of bearing support 20, a vertically projecting portion spaced outwardly from the bearing support 20 and an upper outwardly projecting horizontal seat portion which is suitably braced as by a diagonal brace 25. Upon the seat portion of platform 24 is rigidly fixed a casing 26A, housing a blast fan 26. The casing of the fan is also connected for support and bracing purposes to one of the upright members 16 as by a tie 27. The fan 26 contained within the casing is adapted upon rotation to deliver a blast of air as through a suitable flexible hose 28. Drive of the fan is preferably accomplished responsive to drive of the lug wheels 23, the fan being drivingly coupled to shaft 22, there being preferably a large pulley 29 fixed to and carried by shaft 22 connected as by a belt 30 to a small pulley 31 fixed to the fan shaft 32. Preferably the hose 28 is provided with a rigid nozzle portion 33.

The planter means generally indicated by the reference numeral 13 are supported by a substantially rectangular frame 34, the forward portion of frame 34 being connected to the traction portion 11 by suitable linkage preferably consisting of an upstanding link 35 rigidly fixed at its lower end to ear-like tabs 34A integrally connected with the forward portion of frame 34 and having the rear end of an upper substantially horizontal link 36 pivotally connected to its upper end. The forward upstanding link 37 which is substantially parallel to the link 35, is rigidly fixed at its lower end to the gusset plate 19 and to one of the bearing support angle members, preferably support member 21. Additional connection of the planter frame 34 to the wheeled unit 11 is accomplished by a pair of lower links 38, each of which is journalled at its forward end on the opposite laterally outward end portions of shaft 22, the rearward ends of links 38 being respectively journalled on the outer ends of a transverse rod 39 which extends through and is carried by link 35 adjacent its lower end. It will be seen that the forward portion of frame 34 is supported by the linkage described and through the medium of the linkage the vertical position of the planter means 13 relative to the wheels 23 may be varied.

In order to provide for maintaining the forward end of planter frame 34 in selected adjusted position a stop carrying arm 40 is rigidly fixed to one of the bearing supports as the support 21 and projects upwardly and rearwardly therefrom, being disposed diagonally at an angle of declination from the vertical in the nature of thirty degrees. Arm 40 is of a length to extend upwardly beyond upper link 36 and lies closely alongside link 36. A stop member 41 is removably and adjustably carried by arm 40 and projects from the arm 40 to underlie link 36, being thus engaged by the link during downward shift of the link and limiting such downward shift to the desired distance. Preferably the stop member 41 consists of a stud which is adapted to be selectively inserted in one of the series of adjustment apertures 42 provided in arm 40.

The rearward portion of planter frame 34 is preferably supported by roller portion 12 which includes a roller 43 which is preferably provided with a concaved or dished rim and is adapted, as will be more specifically pointed out, to close a furrow and to assist in packing same. Roller 43 is rotatably supported as upon a shaft 44 carried by a pair of brackets 45. Brackets 45 are shiftably mounted respectively upon upright supports 46, the supports 46 preferably being each provided with a plurality or series of vertically spaced apertures 47 and the brackets 45 being respectively detachably attached as by bolts 48 to selected pairs of apertures 47. The supports 46 are respectively connected at their upper ends as by welding to the rearward extent of bars 49, the forward ends of the bars 49 being rigidly and detachably connected to the rear portion of planter frame 34 as by suitable bolts 50. Intermediate the length of supports 46 and adjacent the upper extremity of the series of apertures 47 additional bars 51 are rigidly connected as by welding, and at their opposite ends the intermediate bars 51 are welded to a transversely extending plate 52 which extends above the members 51 and is connected to the forward end of bars 49 preferably by welding, thus forming a bracing support for roller 43. Mounted on each of the brackets 45 is an upstanding strap 53 which support a transverse rod upon which is mounted the upper end of a scraper blade 54, the lower end of the scraper blade 54 riding on the concaved rim of roller 43 and being shaped to conform to the concavity of the rim so as to snugly engage the surface of the rim as the roller is rotated, thus insuring scraping of the concaved rim during use. Thus will be seen that the rear of the planter frame 34 is supported from roller portion 12, and that roller 43 together with wheels 23 of tractor portion 11 thus provide wheeled support of the entire device for movement in use.

Secured to and depending below frame 34 are a pair of bearings 60 in which a transverse shaft 61 is journalled. Shaft 61 extends laterally outwardly beyond one side of frame 34 and into substantially longitudinal alinement with one of the laterally extending ends of shaft 22 to which shaft 61 is drivingly coupled, preferably by a chain-and-sprocket coupling 62, so that shaft 61 is driven responsive to rotation of shaft 22 under movement of wheels 23.

The seed measuring and planting means of the present invention are primarily mounted upon shaft 61. Keyed to shaft 61 for rotation therewith is a central hub member 63 which is suitably attached to an enlarged annular hub plate 64, hub 63 being preferably provided with an annular flange 65 adapted to lie in face engagement with the hub plate 64 to which the flange is attached as by screws 66. In the plane of hub plate 64 hub 63 is undercut as at 67 where it is closely engaged by the central opening in hub plate 64. To the hub plate 64 are connected a plurality of hollow tubular spokes 68, the spokes 68 being disposed to radially extend from hub plate 64 in circumferentially equally spaced relationship and being preferably removably connected to the hub plate as by attachment screws 69. The spokes 68 are open at their radially inner and outer ends and are adapted to receive and have passed through their interiors seed to be planted by the device.

The spokes 68 at their radially inner ends terminate at a point spaced outwardly from the central hub block 63, and preferably outwardly from the periphery of hub flange 65. Preferably the spokes 68 are additionally interconnected by an annular ring 70, ring 70 being detachably connected as by additional attachment screws 69 to the respective spokes 68.

An upstanding open-mouthed hopper 71 communicates with a central hollow drum 72, drum 72 being concentric with shaft 61 and with hub and hub plate 63, 64. Hopper 71 is bracingly attached to frame 34 as by braces 73 and the hopper is adapted to serve as a source of supply of seeds to be planted and to deliver same into the interior of drum 72. Preferably drum 72 is provided with a diagonally disposed baffle 72A inclined toward hub plate 64 so as to urge seeds delivered into the drum to move by gravity toward the hub plate. Drum 72 is preferably detachably connected to hopper 71 by a hollow throat 74, the upper end of which may be attached to the lower end of the hopper as by suitable thumb screws. The open lower end 74A of throat 74 communicates into the interior of drum 72, preferably in the rear portion of the drum and below the upper level of the drum interior as shown in Fig. 8. Drum 72 is rigidly fixed to a ring 75, within which a circular bucket wheel 76 is rotatably mounted, bucket wheel 76 being secured as by additional attachment screws 66 to hub plate 64 and having an enlarged central opening snugly fitting annular flange 65 of hub 63. Bucket wheel 76 is cut out to provide a plurality of approximately triangular bucket openings 77 extending through the body of the bucket wheel, and being provided with a number of openings equal to the number of spokes 68 employed. Each of the bucket openings 77 is provided with a related substantially triangular scoop 78 projecting from the bucket wheel into drum 72 and being formed immediately adjacent the trailing edge of the respective bucket openings 77 preferably by punching and forming from the material of the bucket wheel. Bucket scoops 78 have their maximum projection from bucket wheels 76 at their radially outer extremities and are inclined inwardly toward the center of the bucket wheel and also toward hub plate 64, merging with the hub plate adjacent their respective apices. Upon rotation of the bucket wheel concurrently with the rotation of the planter wheel formed of the spokes 68, hub 63 and hub plate 64 the scoops 78 are adapted to extend into and be moved through the contents of drum 72 and to engage a measured portion of such contents to move same under such bucket wheel rotation.

Figure 7:
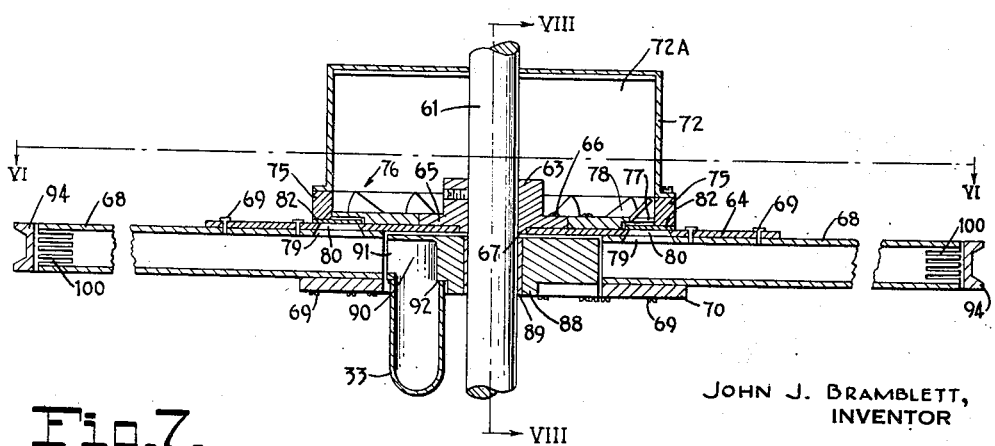
Fig. 7 is a fragmentary sectional plan view on a further enlarged scale taken as on the line VII—VII of Figs. 5 and 6.

Scoops 78 are open at their radially outer extremities and this opening is closed off by fixed ring 75, retaining seeds in the respective scoops 78 against peripheral discharge. Each of the spokes 68 adjacent its radially inner end is apertured as at 79 and hub plate 64 is provided with a plurality of apertures 80, apertures 80 being respectively disposed in register with the spoke apertures 79. As best shown in Fig. 7, the registering apertures 79, 80 are bevelled so that the registering apertures flare toward the interior of the respective spokes 68.

The face of bucket wheel 76 opposite from scoops 78 is undercut to provide an annular shoulder 81, the extent of the undercut being such that shoulder 81 is positioned slightly radially inwardly of the respective registering apertures 79, 80. The undercut in bucket wheel 76 communicates with the respective bucket openings 77. An arcuate flat separator plate 82 is fixed to ring 75 as by screws 83, separator 82 being suitably apertured, as at 84 to receive screws 83, and positioned to lie between ring 75 and hub plate 64. Separator 82 fits into the undercut shoulder 81 on the bucket wheel, the bucket wheel and hub plate being rotatable relative to separator 82, which is fixed. Separator 82 is imperforate throughout its extent with the exception of screw holes 84 which are filled by screws 83 and effectively segregates bucket openings 77 from the alined hub plate and spoke apertures 79, 80. In its upper portion separator 82 is interrupted as at 85 to establish a minor zone during which the segregation of the bucket wheel openings from the spoke and hub plate openings is interrupted, thus providing a minor, non-segregated zone through which the respective spokes of the planter wheel and buckets of the bucket wheels are successively moved during drive of the device, and in which non-segregated zone communication is established between bucket wheel openings 77 and spoke and hub plate openings 79, 80, thus establishing successive momentary communication between the respective scoops and the interior of the related spokes. This non-segregated zone is positioned substantially vertically above shaft 61 so as to provide the maximum gravity-urging of bucket-contained seeds to pass through bucket opening 77 and registered spoke and hub plate openings 79, 80 into the interior of the spoke 68.

Substantially in transverse alinement with the gap 85 in separator 82 is a notch formed in ring 75 through which a finger 86 downwardly projects so as to lie in the rotational path of the bucket scoops 79 as the bucket wheel 76 is rotated during drive of the device. Finger 86 is preferably a short length of tightly coiled spring and is supported from ring 75 as by suitable bracket 87. As a bucket scoop 78 approaches position substantially vertically over shaft 61 the open leading portion of the scoop embraces the depending finger 86 so that the finger is enabled to assist in the discharge of scoop-contained seeds through bucket opening 77, gap 85 in separator 82, and thence into the interior of the related spoke 68. Additionally, the radially inner portion of each of the scoops 78 limits discharge from the raised scoops along the face of bucket wheel 76 until the scoop has reached the upper position in which it is substantially vertically above the shaft, at which time the entry of finger 86 into the open mouth of the scoop prevents accidental discharge of scoop-contained seeds along the face of the bucket wheel and thus insures the desired delivery into the interior of the spokes. Additionally, the spaced sides of gap 85 block the space between the bucket wheel and the hub plate and prevent undesired entry of any seed therebetween. There thus is established an upper non-segregated zone in which delivery of seeds into the interior of the successive spokes is effected.

The open inner ends of the spokes 68 are radially spaced from shaft 61 and ride closely adjacent to the surface of a fixed circular block 88, shaft 61 being journalled in block 88 as by a suitable bushing 89. Circular block 88 is chambered as at 90, chamber 90 being located substantially in horizontal alinement with shaft 61 and being substantially 90 degrees in the direction of rotation away from the non-segregated delivery zone. Chamber 90 opens radially outwardly as at 91, and additionally opens through the lateral face of block 88 as at 92 remote from hub plate 64, the radial opening 91 from chamber 90 being substantially equal in size to the internal cross sectional size of the respective spokes 68, thus providing a discharge port substantially equivalent in size to the internal cross section of the spokes with the spokes being successively moved past the discharge port 91 under drive of the device. Chamber opening 92 provides an inlet port, and hose nozzle 33 is mounted in communication with inlet opening 92, thus establishing pneumatic communication from fan 26 to chamber 90. Preferably nozzle 33 is rigidly connected to frame 34 as by a brace 93 by which the nozzle is held in fixed position, and the open discharge end of the nozzle is suitably rigidly fixed to the laterally outer face of circular block 88. There is thus established an air blast zone at an intermediate point in the rotational movement of the respective spokes, and as the spokes are successively moved past discharge port 91 the air blast delivered therethrough from chamber 90 effectively transfers the seed which have been delivered into the interior of the spokes through the registered openings 79, 80, adjacent the radially inner ends of the spokes to the radially outer ends of the respective spokes.

Discharge of seeds from the open outer ends of the respective spokes 68 is prevented throughout the majority of the rotational travel of the spokes by an arcuate rim-like shoe 94 closely embracing the outer ends of the spokes.

Shoe 94 is supported from the framework and linkage as by upper struts 95, 96, and lower strut 97. The shoe 94 extends preferably through substantially 330°, beginning at point 98 and extending in the direction of rotation arcuately therefrom to end at a low point 99, the interruption in shoe 94 between points 98 and 99 being substantially beyond the air blast zone so that when a spoke 68 is moved beyond the end 99 of the shoe the spoke is positioned at a slight angle of inclination from the vertical, the open outer end of the spoke is freed of the shoe limitation and the spoke contents, transferred by the air blast to a point adjacent the outer end of the spoke, are enabled to quickly and compactly downwardly discharge by gravity. Shortly after the discharge the emptied spoke passes again over the beginning 98 of shoe 94 and its open end is thereafter blocked by the shoe until it has again moved beyond the end 99 thereof. Preferably each of the spokes 68 adjacent its outer end is provided with a plurality of relief vents 100 which are preferably formed by slotting the side walls of the spokes for a minor distance adjacent the outer ends thereof. Thus vents 100 are provided to relieve the accumulation of air blast when same is received during the passage of the spoke through the air blast zone so as to limit the possibility of damage to the seed during transfer from the inner end to the outer end of the spoke which might occur if the relief vents were not provided as by sharply forcing the seeds against the surrounding shoe 94.

The device includes furrow opening plow or sword means suspended from the device and adapted to engage the ground and open a furrow for the reception of seeds deposited from the successive spokes 68. The sword preferably comprises a pair of plate-like elements 101, 102 respectively positioned on the opposite sides of the planter wheel so as to embrace the ends of the spokes when in the lower portion of the rotational travel during drive, and embracing the gap in shoe 94. Preferably the plates 101, 102 along their upper edges are arcuately cut out to minimize the possibility of undesired engagement with the hub members of the planter wheel. At their forward ends the plates 101, 102 are downwardly and rearwardly curved and are joined as by welding to provide a sharpened leading edge 103 for the plow means adapted to effect initial ground penetration and to begin the furrow opening. Edge 103 terminates substantially beneath end 99 of shoe 94, the termination of leading edge 103 being but minutely forward of shoe end 99. Rearwardly therefrom the lower edges of plates 101, 102 are spaced laterally away from the plane of spokes 68 and extend rearwardly in substantial parallelism, the respective plates 101, 102 being provided with attachment flanges 104 rigidly secured to transverse plate 52 adjacent the lower end of the plate. A block 105 is welded to the upper edges of plates 101, 102 substantially at the upper end of leading edge 103 and this block is attached to the lower end of link 35. Plates 101, 102, upward from leading edge 103, belly outward and extend upwardly so as to clear the ends of spokes 68 as same are moved between the plates during rotation. It will be observed that ground penetrating leading edge 103 is positioned longitudinally in alinement with the center of the dished rim of roller 43.

Figure 9:
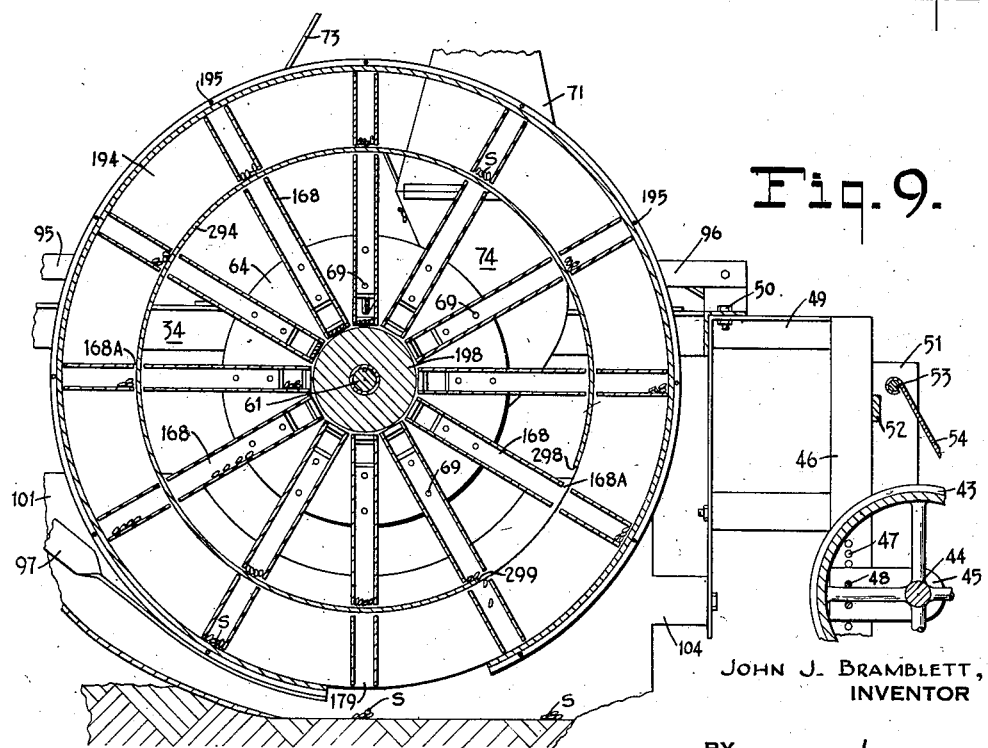
Fig. 9 is a view similar to Fig. 5 of a modified planter device.

In the variation illustrated in Fig. 9 the planter wheel is essentially adapted for operation by gravity and primarily differs from the planter wheel shown in Figs. 5 to 8 inclusive in the elimination of the pneumatic means employed with the previously described device. As illustrated in Fig. 9, a plurality of spokes 168 are connected in radially circumferentially spaced relationship to a hub plate 64 in the manner already described. A hub similar to hub 63 is employed and a bucket wheel 76 mounted in connection with the hub plate to extend into a drum 72, the drum 72 being supplied with seeds from a hopper 71. Spokes 168 are transversely slotted as at 168A, the slots 168A being positioned intermediate the ends of the spokes but spaced inwardly from the outer ends of the spokes. Like the spokes 68, spokes 168 are hollow and open at their respective inner and outer ends. The inner ends of spokes 168 lie closely adjacent to a circular block 188 which is similar to block 88 previously described, with the exception that no air chamber is included in the block 188. A separator 82 is mounted in relationship to the bucket wheel of this unit identical with the relationship previously described, and a finger 86 is positioned and mounted on ring 75 in identical manner. The outer ends of spokes 168 ride upon a shoe 94 of the type already described. To one side of shoe 94 the outer edge of an annular plate-like ring 194 is rigidly connected, the ring projecting radially inwardly. Preferably the ring is detachably connected to shoe 94 as by screws 195, although the ring may be formed integrally with shoe 94 if desired. Along its inner edge ring 194 is provided with a flange-like shoe 294 which is disposed concentrically with shoe 94 and lies in the transverse spoke slots 168A. Shoe 294 throughout its extent interrupts the communication between the inner and outer ends of spokes 168, dividing the spokes into inner and outer sections, and shoe 294 is interrupted in a zone between end 299 and beginning 298 adjacent but spaced in the direction of rotation from the gap in shoe 94, the end 299 of shoe 294 lying on a radius of the wheel which intersects shoe 94 rotationally beyond beginning point 98 of shoe 94, so as to remove the obstruction in communication and to establish uninterrupted communication of the interior of spokes 168 while moved through this zone, thus permitting movement of seeds from the inner portion of spokes 168 by gravity to the outer portion, while preventing discharge of the seeds thus moved from the outer spoke portion.

Figure 10:
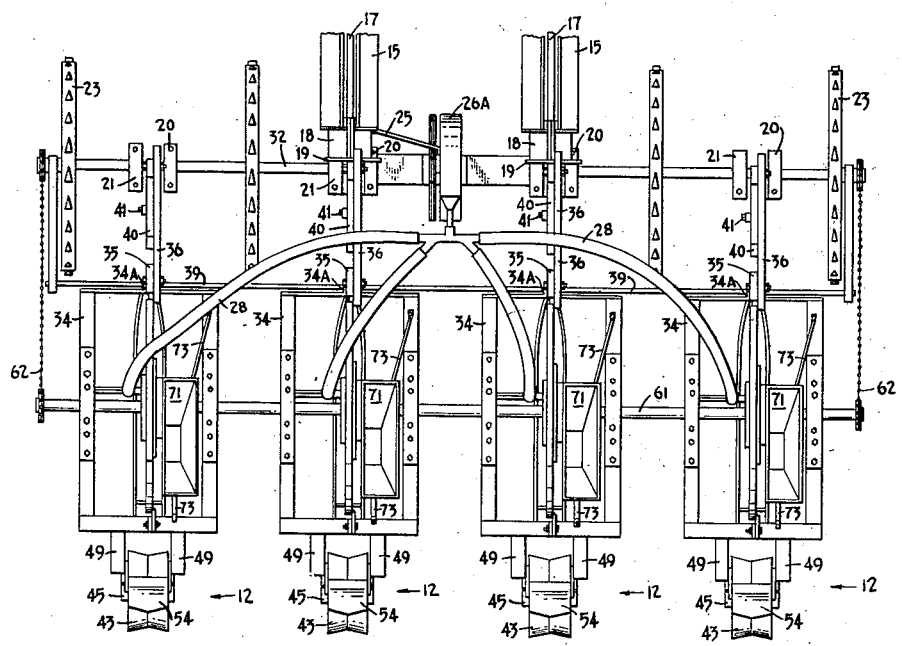
Fig. 10 is a top plan view of the planter device arranged for planting a plurality of crop rows.

In the variation illustrated in Fig. 10, a plurality of planter devices are arranged for conjoint action to accomplish simultaneous planting of a plurality of rows. Essentially this variation comprises elongating the forward shaft 22 and preferably providing same with an additional intermediate wheel 23, and providing a plurality of planter units 13 of the type previously described and including a planter wheel, either as shown in Figs. 5 to 8 inclusive or as shown in Fig. 9, a like plurality of roller portions 12 and blast fan means, like that already described, the fan means being respectively coupled to and driven by shaft 22 in the manner already described. If desired additional fan means may be supplied and similarly coupled and mounted.

In the use of the device of the present invention it may be transported from place to place by tractor 14, the device being preferably elevated during such transportation, the tractor tool-bar-lift-mechanism being effective through the draft and elevating framework 15, 16, 17 to raise the device out of ground contact. During use the device is lowered into ground contacting position, the vertical positioning of planter unit 13 relative to wheels 23 being established through linkage 35, 36, 37, 38 and stop 41 carried by stop arm 40, and by roller portion 12. The stop member 41 is positioned in a selected aperture 42, serving, as previously described, to limit the downward movement of the linkage while permitting upward movement of the linkage and the planter unit supported thereby. Similarly the vertical position of roller 43 is established with attachment bolts 48 being positioned in selected apertures 47 so as to support roller 43 with the lower portion of its surface in ground contacting alinement with the lower ground contacting portion of wheels 23 when the plow means have reached desired depth and link 36 has been moved downwardly into engagement with the stop 41.

Thus the plow means 101, 102, 103 at the beginning of use and prior to ground penetration are enabled to ride upon the ground surface and as the device is drawn along the desired crop row ground penetration begins, the weight of the device tending to move the plow means downwardly and such downward movement continuing until the adjusted depth of penetration is reached and the upper link 36 moves downwardly into contact with the stop 41, and roller 43 moves into ground contact.

A bucket wheel 76, having a desired number of bucket openings 77 and scoops 78, is selected and mounted on hub plate 64 and attached in position by screws 66. The bucket wheel may be provided with a number of scoops and openings equal to the number of spokes 68 or with a less number of equally spaced scoops and openings for employment where it is desired to increase the spacing between the groups of seeds planted by the device. Thus with the illustrated twelve-spoke wheels the bucket wheel may be provided with twelve scoops and openings, six scoops and openings (doubling the basic spacing) or with four scoops and openings, three scoops and openings, two scoops and openings, or a single scoop and opening, correspondingly increasing the spacing between plantings. In order to facilitate mounting and/or change of bucket wheel 76, drum 72 may be readily detached from ring 75 by the removal of screws 66, and throat 74 detached from hopper 71. In the alternative selected spokes 68 may be removed and the hub plate openings closed by straps 64A to prevent delivery of seeds similarly establishing planting spacing. When the selected bucket wheel has been mounted on the hub plate drum 72 may be secured in position and throat 74 connected to hopper 71. With the device assembled and the desired spacing established, hopper 71 is provided with a supply of seeds S. The seeds S drop by gravity through throat 74 and mount 74A into the drum 72 substantially filling the drum except adjacent the top of the drum and being directed by drum baffle 72A toward the face of bucket wheel 76, the scoops 78 of which project into drum 72 and the mass of seeds S contained in the drum.

As the device is moved forwardly through the field and as along the desired crop row, leading edge 103 of the sword means penetrates the ground and the rearwardly extending sword plates 101, 102 serve to turn back the penetrated ground, forming a furrow F for receiving seeds below ground surface level.

With the wheels 23 in ground contact as the device is drawn forwardly by tractor 14, wheels 23 and shaft 22 are rotated and through pulleys 29, 31, coupled by belt 30, drive of fan 26 is set up responsive to rotation of shaft 22. Drive of the fan establishes a source of air pressure which is delivered through hose 28 and nozzle 33 into air chamber 90 of non-rotatable block 88, thus establishing a supply of air under pressure in chamber 90. Concurrently drive of the planter wheel shaft 61 is set up through the drive coupling 62, rotation of shaft 61 establishing rotary drive of the planter wheel, including the composite hub 63, 64, 70, spokes 68 carried thereby, and bucket wheel 76 fixed to hub plate 64.

Rotation of bucket wheel 76 in adjacency to drum 72 causes movement of the bucket scoops 78 through the mass of seeds, effecting an agitation of the drum-contained seeds, minimizing the possibility of undesired packing of the seeds within the drum and maintaining the mass of seeds in loose relationship. Additionally, as the bucket wheel is rotated, scoops 78, projecting into the drum-contained seeds, with the open mouths of the scoops positioned as leading scoop portions in the direction of rotation, successively engage a limited number of the individual seeds contained in the drum, the capacity of the individual scoop being such as to engage the quantity of seed desired for planting as in an individual hill. Since the open scoop moves through the drum-contained seeds over a substantial arc of its rotary path of travel, full capacity loading of the respective scoops is substantially insured, and due to the character of the scoops, seeds in excess of the desired and measured quantity are not retained in the scoop, but instead are enabled to fall along the face of the bucket wheel, returning to the mass of seeds in the drum. In this connection the positioning of hopper delivery mouth 74A, communicating into the rearward portion of drum 72, providing access into the interior of the drum below the level of the top of the drum insures a minor free space adjacent the top of the drum, preventing any impedance to gravity rejection of excess seed during rotation of the bucket wheel.

Thus it will be seen that bucket wheel rotation successively moving the bucket scoops through the drum-contained seeds establishes a measured charge of seed in each of the successive scoops. The scoop-contained charges are retained against radially outward discharge by ring 75 and are retained against discharge toward the alined spoke and hub plate apertures 79, 80 by segregator plate 82.

As each loaded scoop reaches the top of the arc the leading open mouth of the scoop moves into alinement with depending flexible finger 86. In operation the finger 86 is agitated by the next preceding scoop and in effect snaps against the alined scoop effectively knocking from the scoop any undesired excess of seeds which may have adhered to the scoop-contained charge and in the same movement bearing against the scoop-contained charge and urging the charge toward the related scoop aperture 77. Simultaneously the scoop has been moved beyond the gap 85 in separator plate 82, moving thus into the non-segregated zone of travel previously mentioned, at which time communication is established through gap 85 between bucket opening 77 and the alined spoke and hub plate apertures 79, 80. Under the combined urging of resilient finger 86 and of gravity the scoop-contained charge moves downwardly and outwardly along the inclined face of the scoop through bucket opening 77 and into and through spoke and hub plate apertures 79, 80, being then delivered into the interior of the related spoke 68. It will be observed that, at this point of delivery in the non-segregated zone of travel, the related spoke 68 projects substantially vertically upwardly from the hub means of the planter wheel, and the charge of seeds, thus delivered into the interior of the spoke adjacent its inner end, rests upon the peripheral surface of non-rotational block 88.

As the spoke is moved beyond the delivery zone it completes the crossing of gap 85 in separator plate 82 and the segregation of the alined spoke and hub wheel apertures 79, 80 from bucket openings 77 is reestablished. Additionally, the scoop is moved beyond finger 86, setting the finger into agitation and preparing it for engaging the next succeeding scoop.

As shown in Fig. 5, the continued movement of the spoke in its rotational path of travel carries with it the spoke contained charge of seeds resting on and being moved along block 88 substantially through the first quadrant of the rotational travel of the spoke beyond the non-segregated or delivery zone. As the spoke is moved to the full extent of 90 degrees of travel completing the first quadrant of movement, the open inner end of the spoke is moved into register with discharge port 91, and an air blast is delivered from chamber 90 into the interior of the spoke, engaging the charge of seeds contained therein and moving the same outwardly to the radial outer end of the spoke and substantially against shoe 94. As heretofore pointed out, the relief slots 100 in the ends of the spokes permit the exhausting of the air blast, minimizing damage to the charge of seeds transferred by the air blast and also insuring for full and free flow of the air during such transfer. It will be seen that the transfer zone during which the spoke contained seeds are transferred from the inner to the outer end of the spoke occurs at a position in which the spoke is substantially horizontal, reducing to a minimum factors which might impede the transfer.

As the rotational movement of the spoke is continued through the second quadrant the spoke is moved downwardly and rearwardly with the outer end of the spoke closed off by the continuation of shoe 94, the position of the spoke-contained charge of seeds S being maintained by gravity in close adjacency to the outer end of the spoke and substantially resting upon shoe 94. When the second quadrant of rotational movement of the spoke has been substantially completed the spoke is moved beyond shoe end 99 at which time the spoke is extending downwardly substantially vertically, although at a slight angle of inclination from the vertical. With the outer end of the spoke freed of the constraint of shoe 94, the charge of seeds contained within and adjacent the outer end of the spoke discharges by gravity in a compact, closely arranged pattern into the furrow F opened by the plow means as described heretofore.

The spoke thereafter re-enters the closing off effect of shoe 94, passing over the beginning 98 of the shoe which serves to shield the interior of the spoke from the introduction of undesired material, as well as additionally balancing the machine for operation. The spoke continues empty until it has again been moved to the upper delivery zone mentioned above.

This operation has been described for a single spoke and it will be apparent that the cycle of operation is successively passed through by the succeeding spokes.

It will be seen that the charge of seeds deposited by the spokes in the lower discharge or planting zone drop into the furrow F and between plates 101, 102 which lie along-side the ends of the spokes in the lower portion of the path of travel and also lie alongside the lower portions of shoe 94, the parallel spacing of the sword plates 101, 102 serving to make uniform the furrow into which the seeds are deposited. After the deposit of the seeds in the furrow, roller 43 trailing the planter wheel contacts the turned back earth of the furrow with the dished or concaved rim and closes over and packs down the turned earth onto the planted charges of seeds.

The modified form of planter wheel, illustrated in detail in Fig. 9, is provided, particularly for use with certain types of seed, which due to their character are not adapted to be handled by the pneumatic transfer means of the previously described embodiment. Preferably the respective planter wheels are interchangeable, and if it is desired to use the planter wheel as shown in Fig. 9, annular ring 70 is detached from spokes 68 and the spokes 68 are detached from hub plate 64. Chambered block 88 is withdrawn from shaft 61, hose nozzle 33 and brace 93 are removed and block 188 is placed upon shaft 61. Preferably brace 93 and nozzle 33 are replaced with the nozzle being attached to the laterally outer face of block 188 so as to hold same against rotation. Spokes 168 may then be attached to hub plate 64 and annular ring 70 replaced and attached to the spokes 168 to interconnect same. As shown in Fig. 9, ring 194 is connected to the projecting flange of shoe 94, preferably by screws 195, with shoe 294 being positioned in transverse spoke slots 168A.

In the operation of the planter wheel of Fig. 9, drive of the wheel is accomplished in the manner described heretofore and the arrangement of the throat, drum, bucket wheel, finger and separator plate provides for delivery of successive charges of seed S into the interior of spokes 168, which, like spokes 68, are provided with apertures 179 registering with hub plate apertures 80. The delivery zone in which the segregation between the bucket wheel openings and the spoke openings is interrupted is positioned substantially at the topmost point of the path of rotational travel so that a spoke 168 when projecting substantially vertically upward from the hub members receives the delivery of the charge of seeds as previously described.

During continued movement of the spoke in its rotational path of travel the charge of seeds contained therein is moved along the face of block 188, remaining, substantially throughout the first quadrant of movement, adjacent the inner end of the spoke in which the charge is contained. As the movement of the spoke is continued beyond the substantially horizontal position and is moved downwardly and rearwardly transfer of the charge of seeds from the inner end of the spoke outwardly along the interior of spoke is begun by gravity, continuing until the charge of seeds come to rest against the intermediate shoe 294, the completion of this initial transfer taking place during the second quadrant of rotational movement of the spoke. As the movement of the spoke is continued the spoke passes beyond shoe end 299, which as already described, radially overlaps the beginning 98 of shoe 94 so that the open outer end of spoke 198 is closed off by shoe 94. When the spoke has moved beyond shoe end 299 transfer of the charge of seeds to the outer portion of spoke 168 is completed, the charge of seeds dropping by gravity and coming to rest on the inner face of shoe 94.

Further movement of the spoke brings the spoke into re-engagement with the shoe 294, beginning point 298 reentering spoke slot 168A, thus segregating the outer portion of the spoke so as to retain the charge of seeds therein. As the spoke continues to move upwardly and forwardly it is again moved into the delivery zone, previously described, at which time a second charge of seeds is delivered into the interior of the spoke adjacent block 188, the first charge of seeds being maintained in the outer portion of the spoke by intermediate shoe 294. The continued movement of the spoke through its cycle of rotation repeats the operation already described with respect to the second charge of seeds and effects movement of the first charge of seeds within the spoke outer end substantially through two quadrants of rotational movement, it being observed that as the spoke reenters the second quadrant of movement the first charge of seeds moves by gravity to a point closely adjacent shoe 94 so that as the open outer end of the spoke is moved beyond shoe end 99 the charge of seeds is deposited in the furrow F formed by the plow means. Continued movement of the spoke thereafter handles the second charge of seeds in the manner already described with respect to the first charge, completing the transfer of same to the outer section of the spoke.

This operation has been described for a single spoke and it will be apparent that the cycle of operation is successively passed through by the succeeding spokes. Covering and packing of the furrow after depositing of the seeds is effected by roller 43 in the manner already described.

When the use of the planter wheel of the type illustrated in Fig. 9 has been completed, interchange of the wheels may be accomplished by reversing the removal and replacement operations heretofore described with respect to the mounting of the wheel illustrated in Fig. 9, thus reestablishing the planter wheel of the type and kind illustrated in other figures of the drawings.

In the plural planter wheel device shown in Fig. 10, the operation of the individual planter wheels is identical with that already described. The device may employ planter wheels of the type illustrated in Fig. 9, or of the type illustrated in Figs. 5 to 8 inclusive, or part of the planter wheels may be of one type and part of the other type as conditions and type of seeds to be planted may dictate. As can readily be seen, the plural device illustrated in Fig. 10 will be effective to open a plurality of furrows for seed reception and will also be adapted to deposit the seeds into the furrows in spaced relationship, in the individual manners already described heretofore.

It will be seen that with either type of planter wheel the present invention provides means for accurately depositing a measured charge of seeds in a compactly arranged group, without scattering which has characterized previous planters and has accomplished this by measuring the successive charges and delivering such charges to the successive spokes adjacent their inner ends or roots at a point of minimum centrifugal effect on delivery and insuring the transfer of the delivered charges to the outer spoke ends so that the charges are closely proximate to the spoke ends to minimize final planting travel when the spoke end is freed of shoe constraint. In the preferred embodiment the transfer is accomplished and controlled by the pneumatic means provided. In the alternative the transfer is accomplished by gravity and the position of seed charges at the outer end of the spoke for planting discharge is controlled by the supplemental shoe means employed; thus insuring ample time for gravity movement to cause full transfer travel from spoke end to spoke end of the entire charge into a compact grouping, a half rotation often being ineffective for that purpose and resulting in scattering, the supplemental shoe retaining the charge in the outer section so that continued rotation causes radial seed charge movement of minor distance, and effectively compacts the charge against scattering for planting discharge. It will be understood that wtih certain types of seeds it is desirable to provide further supplemental shoe means, dividing the spokes into three or more zones further insuring final compact transfer.

It will be understood that while the fan means 26 has been shown as mounted on the traction portion 11, such fan means may be mounted directly on tractor 14 or may be otherwise mounted on frame 34 or roller portion 12. Additionally, the preferred form of fan drive has been illustrated as coupled by belt and pulley to shaft 22. Obviously other fan drive couplings may be substituted without departing from this invention, such as chain and sprocket couplings; or coupling to planter wheel shaft 61 or directly to the conventional power take-off of the tractor.

The inventions claimed are as follows, it being understood that while the devices in their preferred embodiments have been described in considerable detail, modifications in such detail which are not beyond the scope of the appended claims are intended to be covered thereby.

I claim:

1. In a seed planter device, a planter wheel supported for rotation, said wheel comprising radially projecting hollow spoke means, means for successively loading measured charges of seeds into the interior and inner end of said spoke means in an upper zone of rotation, means for controlling transfer of said charges from said inner end to the radially outer end of said spoke means to compact said charges adjacent said outer end for planting discharge from said outer end, means blocking said outer end against seed discharge, said blocking means terminating in a lower zone of rotation to free said transferred charges for planting discharge by gravity, said means for controlling transfer including air pressure discharge means positioned intermediate said zones, said inner end being moved into register with said air pressure means during wheel rotation.

2. In a seed planter device, a planter wheel supported for rotation, said wheel comprising radially projecting hollow spoke means, means for successively loading measured charges of seeds into the interior and inner end of said spoke means in an upper zone of rotation, means for controlling transfer of said charges from said inner end to the radially outer end of said spoke means to compact said charges adjacent said outer end for planting discharge from said outer end, means blocking said outer end against seed discharge, said blocking means terminating in a lower zone of rotation to free said transferred charges for planting discharge by gravity, said means for controlling transfer including supplemental shoe means intersecting said spoke means intermediate the inner and outer ends of the spoke means and interrupting seed charge transfer into a step by step transfer from spoke means inner end to spoke means outer end.

3. In a seed planter device, a planter wheel supported for rotation in a vertical plane, said wheel comprising a plurality of radially projecting hollow spokes, said spokes being laterally apertured adjacent their inner ends, means for successively delivering seeds into said spokes adjacent their inner ends at an upper zone in the rotational path of said spokes when said spokes project upwardly, said seed delivering means comprising a disc-like wheel having a like plurality of laterally projecting scoops projecting away from said spokes, communication between said scoops and said spoke lateral apertures being established in said upper zone only, the outer ends of said spokes being open for seed discharge by gravity in a lower zone where said spokes project downwardly, and shoe means blocking said spoke outer ends to prevent seed discharge, said shoe means terminating at said lower zone to free said spoke outer ends for seed discharge.

4. In a seed planter device, a planter wheel supported for rotation in a vertical plane, said wheel comprising a plurality of radially projecting hollow spokes, means for successively delivering seeds into said spokes adjacent their inner ends at an upper zone in the rotational path of said spokes when said spokes project upwardly, the outer ends of said spokes being open for seed discharge by gravity in a lower zone where said spokes project downwardly, air pressure means including a discharge port positioned intermediate said zones, said spoke inner ends being open and successively being moved into register with said port to receive air under pressure from said port, said air under pressure transferring seeds from inner end to outer end of said spokes, and shoe means blocking said spoke outer ends opposite said port to prevent seed discharge, said shoe means terminating at said lower zone to free said spoke outer ends for seed discharge.

5. In a seed planter device, a planter wheel supported for rotation in a vertical plane, said wheel comprising a plurality of radially projecting hollow spokes, means for successively delivering seeds into said spokes adjacent their inner ends at an upper zone in the rotational path of said spokes when said spokes project upwardly, the outer ends of said spokes being open for seed discharge by gravity in a lower zone where said spokes project downwardly, a central circular block positioned closely adjacent and radially inward from the inner ends of said spokes, an air chamber formed in one side of said block, said chamber including a discharge port positioned intermediate said zones, air pressure means communicating with said chamber to deliver air under pressure into said chamber and out through said port, said spoke inner ends being open and successively being moved into register with said port to receive said air under pressure from said port, said air under pressure transferring seeds from inner end to outer end of said spokes, said spokes adjacent said outer ends being vented to exhaust said air, and shoe means blocking said spoke outer ends opposite said port to prevent seed discharge, said shoe means terminating at said lower zone to free said spoke outer ends for seed discharge.

6. In a seed planter device, a planter wheel supported for rotation in a vertical plane, said wheel comprising a plurality of radially projecting hollow spokes, means for successively delivering seeds into said spokes adjacent their inner ends at an upper zone in the rotational path of said spokes when said spokes project upwardly, the outer ends of said spokes being open for seed discharge by gravity in a lower zone where said spokes project downwardly, a central circular block positioned closely adjacent and radially inward from the inner ends of said spokes, an air chamber formed in one side of said block, said chamber including a discharge port positioned intermediate said zones, air pressure means communicating with said chamber to deliver air under pressure into said chamber and out through said port, said spoke inner ends being open and successively being moved into register with said port to receive said air under pressure from said port, said air under pressure transferring seeds from inner end to outer end of said spokes, and shoe means blocking said spoke outer ends opposite said port to prevent seed discharge, said shoe means terminating at said lower zone to free said spoke outer ends for seed discharge.

7. In a seed planter device, a planter wheel supported for rotation in a vertical plane, said wheel comprising a plurality of radially projecting hollow spokes, means for successively delivering seeds into said spokes adjacent their inner ends, the outer ends of said spokes being open for seed discharge by gravity in a zone where said spokes project downwardly, a central circular block positioned closely adjacent and radially inward from the inner ends of said spokes, an air chamber formed in one side of said block, said chamber including a discharge port positioned intermediate said zones, air pressure means communicating with said chamber to deliver air under pressure into said chamber and out through said port, said spoke inner ends being open and successively being moved into register with said port to receive said air under pressure from said port after delivery of seeds into said spokes, said air under pressure transferring seeds from inner end to outer end of said spokes, and means blocking said spoke outer ends opposite said port to prevent seed discharge, said blocking means terminating at said lower zone to free said spoke outer ends for seed discharge.

8. In a seed planting device, planter wheel means comprising a plurality of radially hollow spokes, the opposite ends of each said spoke being open, said spokes being mounted for rotation in an upright plane, a source of seed supply mounted in adjacency to the inner ends of said spokes, a disc-like bucket wheel connected to said spokes for rotation therewith, said bucket wheel having a plurality of open bottom scoops laterally projecting from the face of the bucket wheel, said scoops projecting into said seeds and, responsive to bucket wheel rotation, scooping and elevating measured charges of said seeds, said spokes being laterally apertured adjacent their inner ends to establish openings communicating with the hollow interior of said spokes, said spoke openings being positioned respectively in alinement with the open bottoms of said scoops, a separator plate interposed between said spokes and said bucket wheel segregating said spoke openings from said scoop bottoms, said separator plate being nonrotatable and being interrupted in its upper portion to establish an upper non-segregated zone through which said spokes are successively moved during spoke rotation, communication between said scoop bottoms and said spoke openings being successively establishd in said zone for delivery of scoop-contained seeds into said spokes, a resilient finger transversely alined with said zone mounted in the rotational path of travel of said scoops, said finger engaging the scoops contents in said zone and urging discharge through said spoke openings into said spoke interiors; means blocking the outer ends of said spokes to prevent discharge therefrom, said blocking means ending opposite said upper delivery zone, movement of said spokes beyond the end of said blocking means freeing said spoke outer ends for seed discharge, and means for rotating said spokes.

9. In a seed planting device, planter wheel means comprising a plurality of radially projecting hollow spokes having open outer ends, said spokes being mounted for rotation in an upright plane, a source of seed supply including a non-rotatable open-faced drum mounted in adjacency to the inner ends of said spokes, said drum being supplied with seeds from said source of supply, a disc-like bucket wheel connected to said spokes for rotation therewith, said bucket wheel having a plurality of open bottom scoops laterally projecting from the face of the bucket wheel, said scoops projecting into said drum to engage seeds contained in said drum and responsive to bucket wheel rotation to scoop and elevate measured charges of said seeds, said spokes being laterally apertured adjacent their inner ends to establish openings communicating with the hollow interior of said spokes, said spoke openings being positioned respectively in alinement with the open bottoms of said scoops, a separator plate interposed between said spokes and said bucket wheel segregating said spoke openings from said scoop bottoms, said separator plate being non-rotatable and being interrupted in its upper portion to establish an upper non-segregated zone through which said spokes are successively moved during spoke rotation, communication between said scoop bottoms and said spoke openings being successively established in said zone for delivery of scoop-contained seeds into said spokes, a resilient finger transversely alined with said zone mounted in the rotational path of travel of said scoops, said finger engaging the scoop contents in said zone and urging discharge through said spoke openings into said spoke interiors; means blocking the open outer ends of said spokes to prevent discharge therefrom, said blocking means ending opposite said upper delivery zone, movement of said spokes beyond the end of said blocking means freeing said spoke outer ends for seed discharge.

10. In a seed planting device, planter wheel means comprising a plurality of radially projecting hollow spokes having open outer ends, said spokes being mounted for rotation in an upright plane, a source of seed supply including a non-rotatable open-faced drum mounted in adjacency to the inner ends of said spokes, said drum being supplied with seeds from said source of supply, a disc-like bucket wheel connected to said spokes for rotation therewith, said bucket wheel having a plurality of open bottom scoops laterally projecting from the face of the bucket wheel, said scoops projecting into said drum to engage seeds contained in said drum and responsive to bucket wheel rotation to scoop and elevate measured charges of said seeds, said spokes being laterally apertured adjacent their inner ends to establish openings communicating with the hollow interior of said spokes, said spoke openings being positioned respectively in alinement with the open bottoms of said scoops, a separator plate interposed between said spokes and said bucket wheel segregating said spoke openings from said scoop bottoms, said separator plate being non-rotatable and being interrupted in its upper portion to establish an upper non-segregated zone through which said spokes are successively moved during spoke rotation, communication between said scoop bottoms and said spoke openings being successively established in said zone for delivery of scoop-contained seeds into said spokes, means blocking the open outer ends of said spokes to prevent discharge therefrom, said blocking means ending opposite said upper delivery zone, movement of said spokes beyond the end of said blocking means freeing said spoke outer ends for seed discharge.

11. In a seed planting device, planter wheel means comprising a plurality of radially projecting hollow spokes having open outer ends, said spokes being mounted for rotation in an upright plane, a source of seed supply adjacent to the inner ends of said spokes, a disc-like bucket wheel connected to said spokes for rotation therewith, said bucket wheel having a plurality of open bottom scoops laterally projecting from the face of the bucket wheel, said scoops projecting into seeds contained in said supply and responsive to bucket wheel rotation scooping and shifting measured charges of said seeds, said spokes being laterally apertured adjacent their inner ends to establish openings communicating with the hollow interior of said spokes, said spoke openings being positioned respectively in alinement with the open bottoms of said scoops, means interposed between said spokes and said bucket wheel segregating said spoke openings from said scoop bottoms, said segregating means being interrupted to establish a non-segregated zone through which said spokes are successively moved during spoke rotation, communication between said scoop bottoms and said spoke openings being successively established in said zone for delivery of scoop-contained seeds into said spokes, a resilient finger transversely alined with said zone mounted in the rotational path of travel of said scoops, said finger engaging the scoop contents in said zone and urging discharge through said spoke openings into said spoke interiors; means blocking the open outer ends of said spokes to prevent discharge therefrom, said blocking means ending in a zone spaced from said delivery zone, movement of said spokes beyond the end of said blocking means freeing said spoke outer ends for seed discharge.

12. In a seed planting device, planter wheel means comprising a plurality of radially projecting hollow spokes having open outer ends, said spokes being mounted for rotation in an upright plane, a source of seed supply adjacent to the inner ends of said spokes, a disc-like bucket wheel connected to said spokes for rotation therewith, said bucket wheel having a plurality of open bottom scoops laterally projecting from the face of the bucket wheel, said scoops projecting into seeds contained in said supply and, responsive to bucket wheel rotation, scooping measured charges of said seeds, said spokes being laterally apertured adjacent their inner ends to establish openings communicating with the hollow interior of said spokes, said spoke openings being positioned respectively in alinement with the open bottoms of said scoops, plate means interposed between said spokes and said bucket wheel segregating said spoke openings from said scoop bottoms, said plate means being non-rotatable and being interrupted to establish a non-segregated zone through which said spokes are successively moved during spoke rotation, communication between said scoop bottoms and said spoke openings being successively established in said zone for delivery of scoop-contained seeds into said spokes; means blocking the open outer ends of said spokes to prevent discharge therefrom, said blocking means ending in a zone spaced rotationally from said delivery zone, movement of said spokes beyond the end of said blocking means freeing said spoke outer ends for seed discharge.

13. In a seed planting device, planter wheel means comprising a plurality of radially projecting hollow spokes having open outer ends, said spokes being mounted for rotation in an upright plane, a source of seed supply adjacent to the inner ends of said spokes, a plurality of open bottom scoops connected to and laterally projecting away from said spokes, said scoops projecting into seeds contained in said supply and, responsive to spoke rotation, to scooping and moving measured charges of said seeds, said spokes being laterally apertured adjacent their inner ends to establish openings communicating with the hollow interior of said spokes, said spoke openings being positioned respectively in alinement with the open bottoms of said scoops, means segregating said spoke openings from said scoop bottoms, said segregating means being interrupted to establish a minor non-segregated zone through which said spokes are successively moved during spoke rotation, communication between said scoop bottoms and said spoke openings being successively established in said zone for delivery of scoop-contained seeds into said spokes, a resilient finger transversely alined with said zone mounted in the rotational path of travel of said scoops, said finger engaging the scoop contents in said zone and urging discharge through said spoke openings into said spoke interiors; means blocking the open outer ends of said spokes to prevent discharge therefrom, said blocking means ending in a zone spaced below said delivery zone, movement of said spokes beyond the end of said blocking means freeing said spoke outer ends for seed discharge.

14. In a seed planting device, planter wheel means comprising a plurality of radially projecting hollow spokes having open outer ends, said spokes being mounted for rotation in an upright plane, a source of seed supply adjacent to the inner ends of said spokes, a plurality of open bottom scoops connected to and laterally projecting away from said spokes, said scoops projecting into seeds contained in said supply and responsive to spoke rotation to scooping and moving measured charges of said seeds, said spokes being laterally apertured adjacent their inner ends to establish openings communicating with the hollow interior of said spokes, said spoke openings being positioned respectively in alinement with the open bottoms of said scoops, means segregating said spoke openings from said scoop bottoms, said segregating means being interrupted to establish a minor non-segregated zone through which said spokes are successively moved during spoke rotation, communication between said scoop bottoms and said spoke openings being successively established in said zone for delivery of scoop-contained seeds into said spokes; means blocking the open outer ends of said spokes to prevent discharge therefrom, said blocking means ending in a zone spaced below said delivery zone, movement of said spokes beyond the end of said blocking means freeing said spoke outer ends for seed discharge.

15. In a seed planting device, planter wheel means comprising radially projecting, outwardly open hollow spoke means, said spoke means being mounted for rotation, a source of seed supply adjacent to said spoke means, open bottom scoop means connected to and laterally projecting away from said spoke means, said scoop means projecting into seeds contained in said supply and, responsive to spoke means rotation, scooping and moving measured charges of said seeds, said spoke means being apertured adjacent the connection of said scoop means to said spoke means, said scoop means being positioned for communication with the hollow interior of said spoke means, means segregating said spoke means from said scoop means to block said communication, said segregating means being interrupted to establish a minor non-segregated zone, said communication between said scoop means and said spoke means being established in said zone for delivery of scoop-contained seeds into said spoke means, means inwardly blocking said outwardly open spoke means to prevent discharge therefrom, said blocking means ending in a zone spaced from said delivery zone, movement of said spoke means beyond the end of said blocking means freeing said spoke means for seed discharge.

16. In a seed planting device, planter wheel means comprising radially projecting, outwardly open, hollow spoke means, said spoke means being mounted for rotation, a source of seed supply adjacent to said spoke means, seed moving means connected to and laterally projecting away from said spoke means into seeds contained in said supply, for engaging measured charges of said seeds, said spoke means being apertured adjacent the connection of said seed moving means to said spoke means, said seed moving means being positioned for communication with the hollow interior of said spoke means, means segregating said spoke means from said seed moving means, said segregating means being interrupted to establish a minor non-segregated zone, communication between said seed moving means and said spoke means being established in said zone for delivery of seeds into said spoke means, and means limiting seed discharge from said spoke means.

17. Spoke means adapted for use in a rotatable seed planter wheel forming part of a planter device, which device includes spoke blocking means positioned adjacent said wheel in spoke-blocking position, and air blast means; said spoke means being hollow for the receipt of seeds therein adjacent one end, means substantially at said one end for communicating said hollow interior with said air blast means for seed transfer to the other spoke means end, said spoke means being slotted adjacent said other end for relief of air blasts delivered to said hollow interior.

18. In a seed planter device, a planter wheel supported for rotation, said wheel comprising radially projecting hollow spoke means, means for successively loading measured charges of seeds into the interior and inner end of said spoke means in an upper zone of rotation, means for controlling transfer of said charges from said inner end to the radially outer end of said spoke means to compact said charges adjacent said outer end for planting discharge from said outer end, means blocking said outer end against seed discharge, said blocking means terminating in a lower zone of rotation to free said transferred charges for planting discharge by gravity, said means for controlling transfer including supplemental shoe means intersecting said spoke means intermediate the inner and outer ends of the spoke means and interrupting said charge transfer into a setp-by-step transfer from spoke means inner end to spoke means outer end, said shoe means being terminated beyond said lower zone of rotation in the direction of wheel rotation.

19. In a seed planter device, a planter wheel supported for rotation, said wheel comprising radially projecting hollow spoke means, means for successively loading measured charges of seeds into the interior and inner end of said spoke means in an upper zone of rotation, means for controlling transfer of said charges from said inner end to the radially outer end of said spoke means to compact said charges adjacent said outer end for planting discharge from said outer end, means blocking said outer end against seed discharge, said blocking means extending throughout the majority of the circumference of said wheel and being interrupted to provide a gap in a lower zone of wheel rotation to free said transferred charges for planting discharge by gravity, said means for controlling transfer including supplemental shoe means intersecting said spoke means intermediate the inner and outer ends of the spoke means and interrupting seed charge transfer into a step-by-step transfer from spoke means inner end to spoke means outer end, said shoe means being concentric with said blocking means and being interrupted to provide a gap adjacent said blocking means gap, said shoe means gap being positioned in the direction of wheel rotation beyond said blocking means gap.

References Cited in the file of this patent

UNITED STATES PATENTS

| | | |
|---|---|---|
| 684,209 | Everhart | Oct. 8, 1901 |
| 2,097,887 | Lacey | Nov. 2, 1937 |